(12) United States Patent
Fauser

(10) Patent No.: US 8,540,465 B2
(45) Date of Patent: Sep. 24, 2013

(54) TOOL FOR MACHINING WORKPIECE HAVING AN AXIALLY EXTENDING PORTION DEFINING A REFERENCE DIAMETER

(75) Inventor: Lothar Fauser, Nehren (DE)

(73) Assignee: Walter AG, Tubingen (DE)

( * ) Notice: Subject to any disclaimer, the term of this patent is extended or adjusted under 35 U.S.C. 154(b) by 960 days.

(21) Appl. No.: 12/311,463

(22) PCT Filed: Sep. 19, 2007

(86) PCT No.: PCT/EP2007/059907
§ 371 (c)(1),
(2), (4) Date: Dec. 7, 2009

(87) PCT Pub. No.: WO2008/040638
PCT Pub. Date: Apr. 10, 2008

(65) Prior Publication Data
US 2010/0092258 A1    Apr. 15, 2010

(30) Foreign Application Priority Data
Oct. 5, 2006  (DE) .......................... 10 2006 047 496

(51) Int. Cl.
*B23B 51/00* (2006.01)
(52) U.S. Cl.
USPC .............. 408/226; 408/229; 407/33; 407/120
(58) Field of Classification Search
USPC ............................. 408/226, 229, 231; 407/33
See application file for complete search history.

(56) References Cited

U.S. PATENT DOCUMENTS

| 2005/0244237 A1* | 11/2005 | Kuenzel ........................ 408/59 |
| 2008/0206006 A1* | 8/2008 | Bohne ......................... 408/226 |
| 2010/0303568 A1* | 12/2010 | York ......................... 408/1 BD |
| 2012/0134761 A1* | 5/2012 | Nakajima et al. ............. 408/226 |

FOREIGN PATENT DOCUMENTS

| DE | 2 53 778 | 2/1988 |
| DE | 199 15 672 | 10/2000 |
| DE | 10 2005 00903 | 8/2006 |
| EP | 1 344 595 | 9/2003 |
| GB | 1 222 029 | 2/1971 |
| GB | 1 562 229 | 3/1980 |

* cited by examiner

*Primary Examiner* — Alexander P Taousakis
(74) *Attorney, Agent, or Firm* — Morgan, Lewis & Bockius LLP

(57) ABSTRACT

The present invention relates to a tool for machining workpieces, having a shank and a cutting part, wherein the cutting part has a cutting edge section that defines the nominal diameter of the tool, or an insert seat for a cutting insert, the seat having a cutting edge section that defines the nominal diameter of the tool, and wherein the tool has a rotational axis about which the tool rotates in the functionally mounted state. In order to provide a tool having one or more cutting edges, which enables the simple measurement of the nominal diameter, the invention proposes that the tool has at least one axially extending section, which is disposed in the axial direction outside of the cutting edge section defining the nominal diameter, and within which at a plane perpendicular to the rotational axis at least two circumferential sections are provided, which are disposed diametrically opposed of each other in relation to the rotational axis such that a reference diameter is formed, wherein the reference diameter is equal to the nominal diameter of the tool.

9 Claims, 1 Drawing Sheet

TOOL FOR MACHINING WORKPIECE HAVING AN AXIALLY EXTENDING PORTION DEFINING A REFERENCE DIAMETER

The invention concerns a tool for machining workpieces comprising a shank and a cutting part, wherein the cutting part has a cutting edge portion defining the nominal diameter of the tool or an insert seat for a cutting insert, having a cutting edge portion defining the nominal diameter of the tool, and wherein the tool has an axis of rotation about which the tool rotates in the operably mounted condition.

The state of the art discloses rotating tools for machining workpieces, in particular drills, milling cutters and the like. Those tools have one or more cutting edges with which the workpiece to be machined is removed by a cutting action. In that case the cutting edges rotate in operation about the axis of rotation of the tool.

The tools known from the state of the art have a shank with which the tool can be received in a chuck provided for same of the machine. For that purpose the shank is generally of a standardized configuration and is of an outside diameter substantially corresponding to the inside diameter of the tool chuck.

In that case the chucks of the machines are typically standardized and provided in the otherwise cylindrical main body of the tool shank are recesses and flattened portions to permit the tool to be clamped in the chuck and in addition to ensure the transmission of torque in positively locking relationship from the machine to the tool.

In order to make it possible in ongoing operation when changing the tools to determine the nominal diameter of the tool, typically numerical values which specify the nominal diameter of the tool are embossed, engraved or applied by printing in the region of the shank. Those identifications however are rubbed off or ground flat upon frequent changes of the tool, which involve inserting or removing the tool into and from the tool chuck. After a certain service life of the tool therefore for example a chief operator on the spot can no longer ascertain the nominal diameter of the tool in question.

In that case the nominal diameter of the tool has to be determined by measurement. In that respect the maximum diameter of the tool is measured for example by means of a slide gauge, by applying the gauge to two cutting edges which are diametrally in opposite relationship, that is to say 180° in relation to the axis of rotation of the tool. Measurement of the maximum diameter in that simple fashion in operation, that is to say on the workbench, is only possible in the case of a symmetrical distribution of the cutting edges, in respect of which there are at least two diametrally opposite cutting edges extending substantially parallel to the axis of rotation. Even then however such a measurement is frequency inaccurate because the nominal diameter of the tool is often only defined by cutting corners and a slide gauge or the like can be easily applied in a tilted condition to the cutting corners.

In the case of tools which have only one cutting edge or however an asymmetrical arrangement of a plurality of cutting edges so that there are no diametrally opposite axial cutting edge portions, it is in any case not possible to determine the nominal diameter of the tool in such a simple fashion. In those situations measurement of the nominal diameter must be effected by means of complex testing devices for optical or mechanical detection of the tool dimensions.

In comparison with that state of the art the object of the present invention is to provide a tool having one or more cutting edges, which permits simple measurement of the nominal diameter.

In accordance with the invention that object is attained in that there is provided a tool for machining workpieces comprising a shank and a cutting part, wherein the cutting part has a cutting edge portion defining the nominal diameter of the tool or an insert seat for a cutting insert, having a cutting edge portion defining the nominal diameter of the tool, and wherein the tool has an axis of rotation about which the tool rotates in the operably mounted condition, wherein the tool has at least one axially extending portion which is arranged in the axial direction outside the cutting edge portion defining the nominal diameter and within which in a plane perpendicular to the axis of rotation there are provided at least two peripheral portions which are arranged in mutually diametrally opposite relationship in relation to the axis of rotation so that a reference diameter is formed, wherein the reference diameter is equal to the nominal diameter of the tool.

The reference diameter provided on the tool in that fashion makes it possible by means of a slide gauge to precisely determine the nominal diameter in particular of such tools which have only precisely one cutting edge portion defining the nominal diameter or in which there is provided more than one cutting edge portion defining the nominal diameter, the cutting edges being so arranged that they do not have any portions which are arranged in mutually diametrally opposite relationship in a plane perpendicular to the axis of rotation, in relation to the axis of rotation. In such tools, without the reference diameter according to the invention, it would not be possible to determine the nominal diameter of the tool with a simple slide gauge.

Furthermore the reference diameter according to the invention also makes it possible to more easily determine the nominal diameter of tools having two mutually diametrally opposite cutting edge portions. As the reference diameter is arranged in the axial direction outside the cutting edge portion defining the nominal diameter on the tool, it is not subject to any or only a slight degree of wear and alteration over the service life of the tool.

In that respect, in this application the term nominal diameter of the tool is used to denote the maximum outside diameter of the cutting edges which are substantially parallel to the axis of rotation or the cutting corners of the tool when the tool rotates about the axis of rotation. In the case of a drilling tool, that in the ideal case is precisely identical to the inside diameter of the bore produced by the tool.

In that respect here and hereinafter the expression "a cutting edge portion defining the nominal diameter" is used to denote a substantially axially extending portion of a cutting edge, but also a cutting corner which determine the maximum outside diameter of the tool. In the case of drilling tools and end milling cutters typically only the cutting corners which form the transitional region between the main cutting edges arranged at the tip of the tool and the secondary cutting edges extending substantially in the axial direction respectively form the nominal diameter of the tool.

It is evident that the reference diameter according to the invention is not only suitable for tools which have cutting edges or cutting edge portions which are integrally connected to the tool body, but also for tools having insert seats for one or more cutting inserts, wherein the cutting edge portions are provided at the cutting inserts to be mounted in the insert seat and define a unique nominal diameter.

In a particularly preferred embodiment the axial portion with the reference diameter is arranged in the region of the shank of the tool. In that way the axial portion with the reference diameter does not come into engagement with the workpiece in operation and there is also no change in the reference diameter even with long tool service lives, for example due to damage. In that respect it is particularly desirable if the reference diameter is arranged in the region of the shank outside the coupling region serving to receive the tool in the tool holder of the machine. In that way damage to and thus changes in the reference diameter are avoided, which can be caused by the tool coming into engagement with the tool holder.

In a preferred embodiment the peripheral portions defining the reference diameter are disposed on a common cylindrical surface. In particular the reference diameter can be formed by a single cylindrical surface which effectively has in each radial direction a pair of peripheral portions respectively defining the reference diameter. It is however also possible to envisage embodiments in which the reference diameter is formed by two mutually diametrally opposite, parallel flat surfaces, wherein a plurality of such parallel surfaces can define a polygonal configuration extending around the tool shank. Hybrid forms with part-cylindrical portions and flat surfaces, optionally with corresponding transitional surfaces, are also conceivable.

The state of the art discloses a series of standardized tool receiving means for machines, cooperating with tools which have a correspondingly complementary configured shank. The shanks for being received in the standardized tool receiving means are in that case of a diameter which is predetermined by the system for receiving the tool and not by the nominal diameter of the tool. Therefore the portion with the reference diameter, which in accordance with the invention is provided on the tool, is desirable in particular for such tools in which the diameter of the shank in the region provided for the tool being received is independent of the nominal diameter of the tool and in particular is different therefrom.

A particularly preferred embodiment of the invention is one in which the axial portion forming the reference diameter is offset with respect to the rest of the tool, wherein preferably the regions of the tool adjoining the axial portion of the reference diameter are of a different diameter from the reference diameter. Such an arrangement makes it possible for a user on the spot to uniquely identify the reference diameter on the tool and correctly apply the measurement instrument, for example a slide gauge. In that respect the reference diameter can project with respect to the adjoining portions of the tool or can be let thereinto for example in the form of a groove. Embodiments are preferred in which the reference diameter is arranged in a transitional region from a diameter which is smaller than the reference diameter to a diameter which is larger than the reference diameter.

To ensure simple application of the measurement tool, it is desirable if the axial portion forming the reference diameter is of a width or height in the axial direction of between 1 mm and 5 mm, preferably being 2 mm.

Further advantages, features and possible uses of the present invention will be apparent from the description hereinafter of a preferred embodiment and the accompanying Figures in which.

Figure 1:
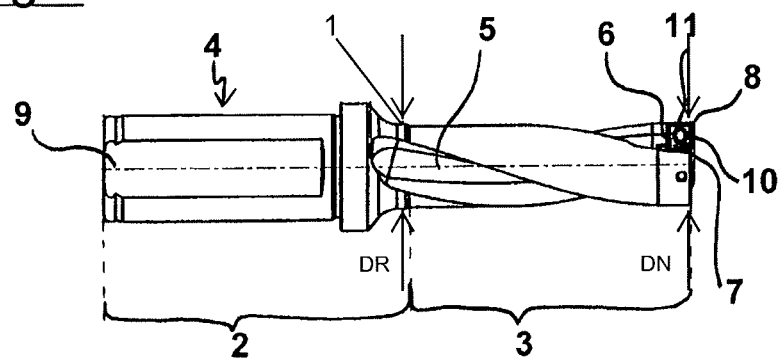
FIG. 1 shows a side view of a drilling tool according to the invention.

FIG. 1 shows a side view of a drill having the portion 1 with the reference diameter (DR), in accordance with the invention. The drilling tool comprises a shank 2 and a cutting part 3. The shank 2 in turn has a portion 4 provided for being received in the chuck of a machine tool. The illustrated cutting part 3 has flutes 5 serving to remove chips from the drilled hole. Provided at the front end of the cutting part 3 is a single insert seat 6 for a cutting insert 7. The tool with the fitted cutting insert 7 therefore has only a single cutting corner 8 defining the nominal diameter (DN). That cutting corner 8 forms the transition between the main cutting edge 10 and the secondary cutting edge 11 of the cutting insert 7.

The nominal diameter (DN) of the drill is defined by the maximum peripheral line of the cutting edge 8 upon rotation of the drill about the axis of rotation 9. Provided at the front end of the shank 2, that is towards the cutting part 3, is a portion 1 which is of the nominal diameter (DN) of the drilling tool. In that region it is possible by means of a slide gauge to measure the nominal diameter (DN) of the drill although at its tip the drill carries only a single cutting corner 8 defining the nominal diameter (DN) of the drill.

Figure 2:
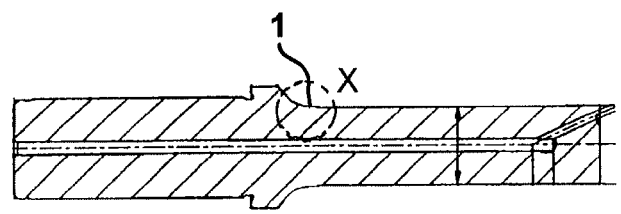
FIG. 2 shows a sectional view through the drilling tool of FIG. 1.
Figure 3:
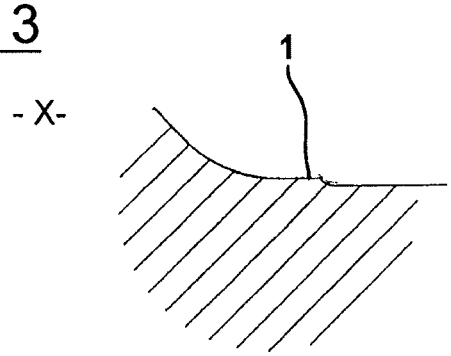
FIG. 3 shows a view on an enlarged scale of a portion of the reference diameter of FIG. 2.

The arrangement of the portion 1 with the reference diameter (DR) can be once again clearly seen from FIG. 2. FIG. 3 shows a view on an enlarged scale of the region identified by X of the drill of FIG. 2. It can be clearly seen from this enlarged view that the portion 1 with the reference diameter (DR) is arranged in a transitional region of the drill from a smaller diameter in the region of the cutting part 3 towards a larger diameter of the drilling tool in the region of the shank 2.

The portion 1 with the reference diameter (DR) is arranged in the discharge region of the flutes 5, which region extends into the shank 2 of the tool. In that way in operation the portion 1 cannot be damaged or altered either by the chuck of the machine which comes into engagement with the receiving region 4 or by the workpiece coming into engagement with the cutting part.

In the illustrated preferred embodiment the portion 1 of the shank with the nominal diameter (DN) is of a width in the axial direction of 2 mm. That ensures the jaws of a slide gauge can be easily applied to the axial portion 1 of the reference diameter (DR).

LIST OF REFERENCES 1 portion with reference diameter
2 shank
3 cutting part
4 portion for being received in the chuck of a machine tool
5 flutes
6 insert seat
7 cutting insert
8 cutting edge
9 axis of rotation
10 main cutting edge
11 secondary cutting edge

The invention claimed is:

1. A tool for machining workpieces comprising a shank and a cutting part,
wherein the cutting part has at least one cutting edge portion defining the nominal diameter of the tool or at least one insert seat for a cutting insert having a cutting edge portion defining the nominal diameter of the tool,
wherein the tool has an axis of rotation about which the tool rotates in the operably mounted condition,
wherein the tool has at least one further axially extending portion which is arranged in the axial direction outside the cutting edge portion defining the nominal diameter and within which in a plane perpendicular to the axis of rotation there are provided at least two peripheral portions which are arranged in mutually diametrally opposite relationship in relation to the axis of rotation so that a reference diameter is formed, wherein the reference diameter is equal to the nominal diameter of the tool, wherein in the region of the shank it has a portion for the tool to be received in a standardized tool holder of a machine, wherein the diameter of the receiving portion is different from the nominal diameter of the tool, and wherein the axially extending portion is offset with respect to the rest of the tool, and wherein the regions of the tool which adjoin the axially extending portion with the reference diameter are of a different diameter from the reference diameter.

2. A tool as set forth in claim 1 wherein the tool has precisely one cutting edge portion which defines the nominal diameter of the tool or precisely one insert seat for a cutting insert with precisely one cutting edge portion defining the nominal diameter of the tool.

3. A tool as set forth in claim 1 wherein the tool has more than one cutting edge portion defining the nominal diameter of the tool or more than one insert seat for a cutting insert, and wherein the cutting edge portions are so arranged that they have no portions which are arranged in mutually diametrally opposite relationship in a plane perpendicularly to the axis of rotation in relation to the axis of rotation.

4. A tool as set forth in claim 1 wherein the axially extending portion with the reference diameter is arranged in the region of the shank.

5. A tool as set forth in claim 4 wherein the axially extending portion with the reference diameter is arranged outside a portion of the shank, which portion is provided for the tool to be received in a tool holder of a machine.

6. A tool as set forth in claim 1 wherein the axially extending portion with the reference diameter is arranged at the level of an end portion of flutes or immediately behind the end portion.

7. A tool as set forth in claim 1 wherein the axially extending portion is of circular symmetry.

8. A tool as set forth in claim 1 wherein the axially extending portion is of a width of between 1 mm and 5 mm, in the axial direction.

9. A tool as set forth in claim 8 wherein the width of the axially extending portion in the axial direction is 2 mm.

\* \* \* \* \*